May 26, 1959
T. TINKER
2,888,250
HIGH PRESSURE CLOSURE
Filed Sept. 26, 1955
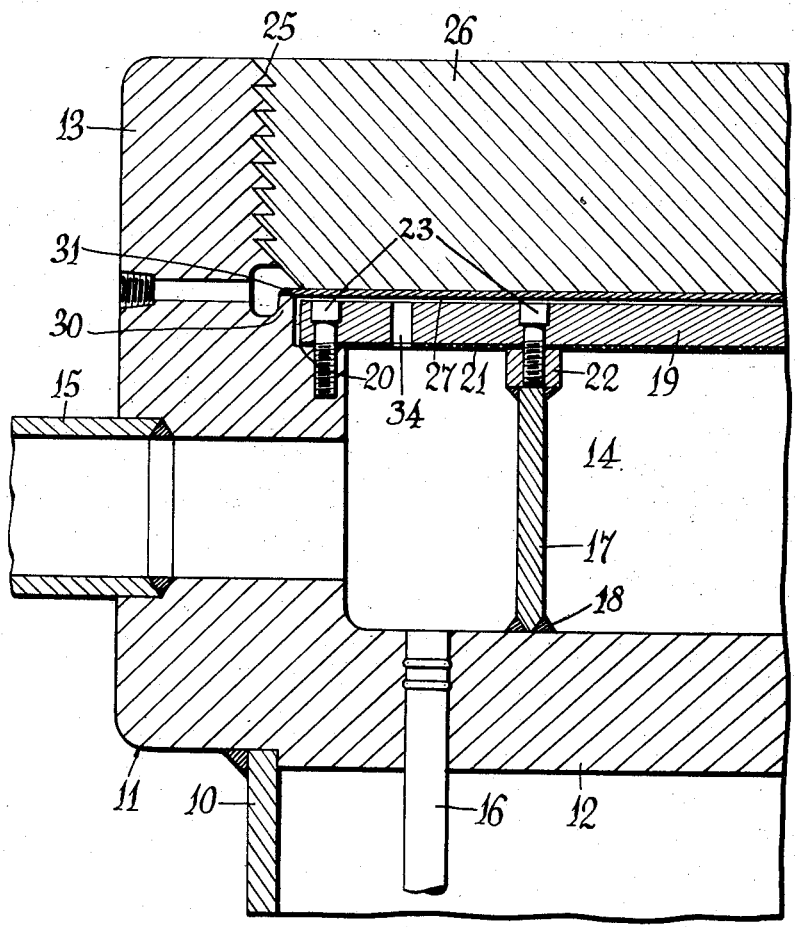
INVENTOR:
TOWNSEND TINKER
BY
Beau, Brooks, Buckley & Beau,
ATTORNEYS.

2,888,250
Patented May 26, 1959

2,888,250
HIGH PRESSURE CLOSURE

Townsend Tinker, Orchard Park, N.Y., assignor, by mesne assignments, to American Radiator & Standard Sanitary Corporation, New York, N.Y., a corporation of Delaware Application September 26, 1955, Serial No. 536,698

9 Claims. (Cl. 257—221)

This invention relates to closures for pressure vessels and more particularly to covers or closure members for high pressure heads for heat exchangers and similar apparatus.

The problem of sealing vessels against high internal pressures by means of removable closure heads or covers presents many problems and has been the subject of much development and experimentation. The extremely high internal pressures frequently encountered presents a considerable problem in maintaining an adequate seal and transmitting and distributing the stresses resulting from such high internal pressures.

Because of the complexity and difficulty of the general problem, such closure or cover members have become increasingly complex. It is recognized as advantageous to separate or divorce, to some extent, the fluid seal means from the structural load-bearing portion of the closure means, so that the main hydrostatic pressure load against the latter does not act against the fluid seal means.

In recognition of this desirability and in providing high pressure closures with that end in view it is frequently proposed and practiced to employ multiple closures wherein, generally speaking, an inner closure member provides a hermetic seal against leakage and a separate outer closure member bears the hydrostatic load applied to the closure means by the internal fluid pressure forces in the vessel.

The present invention provides a high pressure closure wherein the advantages of transmitting the hydrostatic pressure load to the body of the vessel independently of the fluid seal and without applying any of the pressure load thereto is made available in a novel manner and in an arrangement whereby the pressure fluid is sealed and isolated from the portion of the closure which transmits the pressure load to the body of the vessel. These objects are accomplished in a simple, practical and economical manner.

In the construction of the present invention the pass rib or pass plate cover is drawn into position in the head of the vessel and against the pass rib or pass plate by means of screws and with an intervening gasket sealed joint, so that the pass rib cover may readily be removed by removal of the retaining screws when it is desired to gain access to the underlying tube sheet.

The present invention provides a welded seal closure construction which hermetically seals the pass rib cover and its screw means and the interior of the head of the pressure vessel so that the pressure fluid cannot attack or gain access to the outer cover structure which bears the hydrostatic pressure load. This is accomplished by a diaphragm which overlies the pass rib cover and is marginally welded in place in the head of the vessel in such manner as to entirely enclose the otherwise readily removable pass rib cover.

The construction of the present invention comprises a detachable pass rib cover which has an opening or passage means between the head space at one side of the pass rib or pass plate and the upper side of the pass rib cover, whereby the pass rib cover is under balanced and substantially equal pressures at opposite sides so that the gasket and the screws retaining the pass rib cover and the gasket are subject only to the forces and pressures involved in properly retaining the pass rib cover and the gasket.

A relatively thin diaphragm overlies the pass rib cover as aforesaid and abuts outwardly against an outer cover which is interlockingly associated with the body of the vessel proper to transmit the hydrostatic pressure load directly thereto and without burdening the pass rib cover or its gasket means and without exerting this hydrostatic pressure load against the seal weld which hermetically seals the marginal edges of the diaphragm to the body of the vessel.

In the construction of the present invention access to the pass rib cover and the underlying tube sheet and tubes is gained by removal of the marginal seal weld which retains the diaphragm and chipping off or otherwise removing this single weld permits ready access to the interior of the head of the vessel.

While a single embodiment of the principles of the present invention is set forth in detail herein by way of example, it is to be understood that the scope of the invention is not necessarily limited thereto or otherwise than as defined in the appended claims.

The single figure of the drawing is a fragmentary cross sectional view taken longitudinally through a corner of a pressure vessel provided with one form of the closure of the present invention.

The drawing shows what may be considered to be the upper lefthand corner of a cylindrical pressure vessel which extends vertically as viewed in the drawing. The vessel has a main hollow cylindrical body portion 10 and a head member welded to the upper end thereof, the head member being designated generally by the numeral 11 and comprising a radial wall portion 12 which in the present instance provides a tube sheet for a tube-type heat exchanger. Head member 11 further includes a cylindrical portion 13 which extends axially outwardly from the pressure vessel proper (upwardly as viewed in the drawing).

Pressure fluid such as high pressure water or superheated steam may enter the head space 14 by way of an inlet conduit 15 and the numeral 16 designates, merely by way of example, one of the usual plurality of tubes fixed in tube sheet 12. A conventional pass plate 17 is welded within the head space 14 as at 18, and the division of the head space into inlet and outlet portions is completed by a removable pass rib cover or seal plate 19.

The cylindrical portion 13 of head member 11 is provided with an axial outwardly facing ledge 20 for receiving pass rib cover 19 and a gasket 21 acts between ledge 20 and the overlying portion of pass rib cover 19 and also between the latter and an enlarged head portion 22 of pass rib or pass plate 17. The pass rib cover 19 is removably held in position by screws 23 which likewise apply proper sealing pressure to gasket 21.

The interior of head member 11 outwardly of head space 14 is provided with internal buttress threads as at 25 and a rigid cover member 26 is peripherally threaded to engage the internal threads 25. A diaphragm 27 lies between outer cover member 26 and pass rib cover 19 and is welded marginally to a flange formation 30 formed on cylindrical portion 13 of head member 11 either directly by machining or by means of a built-up weld. The weld which directly secures diaphragm 27 to flange 30 is designated 31 in the drawing.

Diaphragm 27 abuts outer cover member 26 to transfer directly thereto the hydrostatic pressure load which acts outwardly on the diaphragm by reason of an equalizing pressure passage 34 in pass rib cover 19.

What is claimed is:

1. Pressure vessel means comprising a hollow cylinder having an open end and closure means therefor, said vessel having an outwardly facing ledge spaced axially inwardly of the open end thereof, a pass plate defining inlet and outlet chamber portions in said vessel, the outer edge of said pass plate being substantially coplanar with said ledge, gasket means seating on said ledge and said pass plate edge, a pass plate cover member seating on said gasket means and screwed to said ledge and said pass plate, passage means for equalizing fluid pressure at opposite sides of said cover member, a diaphragm overlying said cover member and welded marginally to said ledge to provide a hermetic enclosure over said cover member and its screw means, and an outer cover member in releasable interfitting engagement with said vessel and in abutment with said diaphragm substantially throughout the outer surface of the latter whereby the internal fluid pressure force of the vessel is borne substantially entirely by the outer cover member and said vessel.

2. A pressure vessel having an open end and closure means therefor, said vessel having an outwardly facing ledge spaced axially inwardly of the open end thereof, a pass plate defining inlet and outlet chamber portions in said vessel, the outer edge of said pass plate being substantially coplanar with said ledge, pass plate cover means seating on said ledge and said pass plate edge and screwed thereto, passage means for equalizing fluid pressure at opposite sides of said cover means, a diaphragm overlying said cover means and welded marginally to said ledge to provide a hermetic enclosure over said cover means and its screw means, and an outer cover member in releasable interfitting engagement with said vessel to transmit pressure forces acting against said outer cover member to said vessel, said outer cover member being in abutment with said diaphragm substantially throughout the outer surface of the latter whereby the internal fluid pressure force of the vessel is borne substantially entirely by the outer cover member.

3. Pressure vessel means comprising a hollow cylinder having an open end and closure means therefor, said vessel having an outwardly facing ledge spaced axially inwardly of the open end thereof, a pass plate defining inlet and outlet chamber portions in said vessel, cover means seating on said ledge and said pass plate edge and screwed thereto to seal the inlet and outlet chamber portions from each other, passage means for equalizing fluid pressure at opposite sides of said cover means, a diaphragm overlying said cover means and welded marginally to said ledge to provide a hermetic enclosure over said cover means and its screw means, and an outer cover member in releasable interfitting engagement with said vessel to transmit pressure forces acting against said outer cover member to said vessel, said outer cover member being in abutment with said diaphragm substantially throughout the outer surface of the latter whereby the internal fluid pressure force of the vessel is borne substantially entirely by the outer cover member.

4. Pressure vessel means comprising a hollow cylinder having an open end and closure means therefor, said vessel having an outwardly facing ledge spaced axially inwardly of the open end thereof, a pass plate defining inlet and outlet chamber portions in said vessel, cover means seating on said ledge and said pass plate edge and screwed thereto to seal the inlet and outlet chamber portions from each other, passage means for equalizing fluid pressure at opposite sides of said cover means, a diaphragm overlying said cover means and welded marginally to the interior of said hollow cylinder outwardly of said ledge to provide a hermetic enclosure over said cover means and its screw means, and an outer cover member in releasable interfitting engagement with said vessel and in abutment with said diaphragm substantially throughout the outer surface of the latter whereby the internal fluid pressure force of the vessel is borne substantially entirely by the outer cover member.

5. A pressure vessel having an open end and closure means therefor, said vessel having an outwardly facing ledge spaced axially inwardly of the open end thereof, a pass plate defining inlet and outlet chamber portions in said vessel, the outer edge of said pass plate being substantially coplanar with said ledge, gasket means seating on said ledge and said pass plate edge, a pass plate cover member seating on said gasket means and screwed to said ledge and said pass plate, passage means for equalizing fluid pressure at opposite sides of said cover member, a diaphragm overlying said cover member and welded marginally to the interior of said vessel outwardly of said ledge to provide a hermetic enclosure over said cover member and its screw means, and an outer cover member in releasable interfitting engagement with said vessel and in abutment with said diaphragm substantially throughout the outer surface of the latter whereby the internal fluid pressure force of the vessel is borne substantially entirely by the outer cover member.

6. Pressure vessel means having an open end and closure means therefor, said vessel having an outwardly facing ledge spaced axially inwardly of the open end thereof, a pass plate defining inlet and outlet chamber portions in said vessel, the outer edge of said pass plate being substantially coplanar with said ledge, gasket means seating on said ledge and said pass plate edge, a pass plate cover member seating on said gasket means and screwed to said ledge and said pass plate, passage means for equalizing fluid pressure at opposite sides of said cover member, a diaphragm overlying said cover member and secured marginally in sealing relation to the interior of said vessel outwardly of said ledge to provide a hermetic enclosure over said cover member and its screw means, and an outer cover member in releasable interfitting engagement with said vessel and in abutment with said diaphragm substantially throughout the outer surface of the latter whereby the internal fluid pressure force of the vessel is borne substantially entirely by the outer cover member.

7. Pressure vessel means having an open end and closure means therefor, said vessel having an outwardly facing ledge spaced axially inwardly of the open end thereof, a pass plate defining inlet and outlet chamber portions in said vessel, the outer edge of said pass plate being substantially coplanar with said ledge, pass plate cover means seating on said ledge and said pass plate edge and screwed thereto, passage means for equalizing fluid pressure at opposite sides of said cover member, a diaphragm overlying said cover member and secured marginally in sealing relation to the interior of said vessel outwardly of said ledge to provide a hermetic enclosure over said cover member and its screw means, and an outer cover member in releasable interfitting engagement with said vessel and in abutment with said diaphragm substantially throughout the outer surface of the latter whereby the internal fluid pressure force of the vessel is borne substantially entirely by the outer cover member.

8. Pressure vessel means comprising a hollow cylinder having an open end and closure means therefor, said vessel having an outwardly facing ledge spaced axially inwardly of the open end thereof, a pass plate defining inlet and outlet chamber portions in said vessel, the outer edge of said pass plate being substantially coplanar with said ledge, gasket means seating on said ledge and said pass plate edge, a pass plate cover member seating on said gasket means and screwed to said ledge and said pass plate, passage means for equalizing fluid pressure at opposite sides of said cover member, a diaphragm overlying said cover member and welded marginally to said ledge to provide a hermetic enclosure over said cover member and its screw means, and an outer cover member in peripheral threaded engagement with said vessel and in abutment with said diaphragm substantially throughout the outer surface of the latter whereby the internal fluid pressure force of the vessel is borne substantially entirely by the outer cover member and said vessel.

9. A pressure vessel means having an open end and closure means therefor, said vessel having an outwardly facing ledge spaced axially inwardly of the open end thereof, a pass plate defining inlet and outlet chamber portions in said vessel, the outer edge of said pass plate being substantially coplanar with said ledge, pass plate cover means seating on said ledge and said pass plate edge and screwed thereto, passage means for equalizing fluid pressure at opposite sides of said cover means, a diaphragm overlying said cover means and welded marginally to said ledge to provide a hermetic enclosure over said cover means and its screw means, and an outer cover member in peripheral threaded engagement with said vessel and in abutment with said diaphragm substantially throughout the outer surface of the latter whereby the internal fluid pressure force of the vessel is borne substantially entirely by the outer cover member.

References Cited in the file of this patent

UNITED STATES PATENTS

| | | |
|---|---|---|
| 1,897,213 | Price et al. | Feb. 14, 1933 |
| 2,009,877 | Dodd | July 30, 1935 |
| 2,133,934 | Ericsson et al. | Oct. 18, 1938 |
| 2,219,659 | Price | Oct. 29, 1940 |
| 2,247,105 | Tinker | June 24, 1941 |
| 2,766,903 | Boni | Oct. 16, 1956 |